United States Patent
Yajima et al.

(10) Patent No.: US 9,145,941 B2
(45) Date of Patent: Sep. 29, 2015

(54) HOLLOW COIL SPRING AND METHOD FOR MANUFACTURING SAME

(75) Inventors: Takashi Yajima, Yokohama (JP); Kenichiro Morino, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 17 days.

(21) Appl. No.: 13/989,923

(22) PCT Filed: Nov. 24, 2011

(86) PCT No.: PCT/JP2011/077055
§ 371 (c)(1),
(2), (4) Date: May 28, 2013

(87) PCT Pub. No.: WO2012/073786
PCT Pub. Date: Jun. 7, 2012

(65) Prior Publication Data
US 2013/0292890 A1    Nov. 7, 2013

(30) Foreign Application Priority Data
Dec. 1, 2010    (JP) .................................. 2010-268156

(51) Int. Cl.
*F16F 1/04*    (2006.01)
*B21D 22/14*    (2006.01)
(Continued)

(52) U.S. Cl.
CPC ................ *F16F 1/042* (2013.01); *B21D 11/06* (2013.01); *B21D 22/14* (2013.01); *B21D 41/045* (2013.01); *B21F 35/00* (2013.01); *Y10T 29/49609* (2015.01)

(58) Field of Classification Search
CPC ......... F16F 1/042; B21D 22/14; B21D 11/06; B21D 41/045

USPC .................... 267/166–180; 29/896.9, 896.91, 29/896.93; 72/370.12
See application file for complete search history.

(56) References Cited

U.S. PATENT DOCUMENTS 2,284,210 A * 5/1942 Johnson ...................... 228/112.1
3,031,006 A * 4/1962 Fokkinga ........................ 72/138
(Continued)

FOREIGN PATENT DOCUMENTS

JP    B-181968    5/1956
JP    A-48-101356    12/1973
(Continued)

OTHER PUBLICATIONS

Dec. 3, 2012 Japanese Office Action issued in Japanese Patent Application No. 2010-268156 (with translation).
(Continued)

*Primary Examiner* — Bradley King
(74) *Attorney, Agent, or Firm* — Oliff PLC

(57) ABSTRACT

In an end sealing step, an end is sealed by which the core material of the end of a spring member is gathered by machining. For example, a squeezing roller is moved in an axial direction as necessary, while the end of the spring member is pressed to the inside in a radial direction by the squeezing roller. As a result, the end of the spring member is sealed and therefore, it is not necessary to use another member such as a lid member. For example, the end sealing step can be immediately carried out after an inner surface processing step. In a coil forming step after the end sealing step, formation of clearance can be prevented at the end even if the end of the spring member is gripped and the spring member is wound around the rod.

3 Claims, 2 Drawing Sheets

(51) Int. Cl.
  *B21D 41/04* (2006.01)
  *B21F 35/00* (2006.01)
  *B21D 11/06* (2006.01)

(56) References Cited

U.S. PATENT DOCUMENTS

| | | | | |
|---|---|---|---|---|
| 4,361,360 | A | * | 11/1982 | Kuether .................. 301/127 |
| 8,132,438 | B2 | * | 3/2012 | Mishima ..................... 72/38 |
| 2010/0052231 | A1 | * | 3/2010 | Eto ............................. 267/166 |
| 2013/0023347 | A1 | | 1/2013 | Okada |

FOREIGN PATENT DOCUMENTS

| | | |
|---|---|---|
| JP | U-49-83454 | 7/1974 |
| JP | U-56-65738 | 6/1981 |
| JP | A-59-33041 | 2/1984 |
| JP | A-60-137531 | 7/1985 |
| JP | H11-230221 A | 8/1999 |
| JP | A-2000-97779 | 4/2000 |
| JP | A-2007-127227 | 5/2007 |
| KR | 2012-0037591 A | 4/2012 |
| WO | 2011/125189 A1 | 10/2011 |

OTHER PUBLICATIONS

Mar. 29, 2013 Japanese Office Action issued in Japanese Patent Application No. 2010-268156 (with translation).
Jan. 10, 2012 International Search Report issued in International Application No. PCT/JP2011/077055.
Jun. 15, 2015 Search Report issued in European Patent Application No. 11844526.1.

* cited by examiner

HOLLOW COIL SPRING AND METHOD FOR MANUFACTURING SAME

TECHNICAL FIELD

The present invention relates to a hollow coil spring and relates to a method of manufacturing therefor. In particular, the present invention relates to a method for sealing the hollow coil spring.

BACKGROUND ART

In order to reduce the weight of vehicles (such as cars and the like), it has been proposed that hollow coil springs be used as spring parts (for example, Patent Document 1). The hollow coil spring of Patent Document 1 is produced by performing a hot hydrostatic extrusion step, a thickness reduction step, a rolling step, a coil forming step, a heating step, an end surface polishing step, a surface processing step, a setting step, and a coating step in turn. In the hot hydrostatic extrusion step, a seamless spring steel pipe is formed. In the hollow coil spring, a spring member (a seamless spring steel pipe or the like) is used, so that fatigue strength to torsional stress and bending stress can be improved.

Patent Document 1 is Japanese Unexamined Patent Application Publication No. 2007-127227.

DISCLOSURE OF THE INVENTION

Problems Solved by the Invention

However, there is a concern that the following problems may occur, since ends of the conventional hollow coil springs are sealed using a resin, etc., in a final step. According to the surface processing step, defects are removed on an inner surface of a hollow spring member, and therefore, when ends of the hollow spring are not immediately sealed, the inner surface is corroded. Additionally, in the coating step, when a baking step is carried out for drying a coated solution, the inside of the spring member is heated, and materials such as coated solution, etc., adhered to the inner surface are gasified, and dripping occurs near the end, and as a result, the product appearance thereof is deteriorated.

As described above, there is a concern that a special problem, which does not occur in manufacturing a solid coil spring, will occur in manufacturing the hollow coil spring. Therefore, an object of the present invention is to provide a hollow coil spring and a method of manufacturing therefor which can prevent corrosion of an inner surface thereof and can improve product appearance thereof.

Means for Solving the Problems

In order to solve the above problems, the inventors found that both ends of the spring member were sealed after a surface processing step in which a surface processing such as a polishing of an inner surface of a hollow spring member, etc., was carried out and before other steps, and intensively researched various sealing methods. For example, a method in which lid members in a plate shape were separately provided at both ends of the spring member and were welded to the ends, or a method in which lid members having a screw portion were separately provided at both ends of the spring member and the screw portion was screwed onto the end, was attempted. In this case, in the coil forming step, since the lid member was deformed when the end with the lid member was gripped by a chuck portion and the spring member was wound around a rod, clearance was formed between the lid member and the end of the spring member, and therefore, the above problem occurred.

In contrast, the inventors found that a method for sealing ends of a hollow spring by which core material thereof is gathered by machining, does not cause the above problem to occur, and thereby completed the present invention. That is, a method for manufacturing a hollow coil spring according to the present invention includes an end sealing step for sealing ends by which core material of an end of a hollow spring member is gathered by machining, and a coil forming step for forming the hollow spring member in a coil shape after the end sealing step.

According to the method for manufacturing a hollow coil spring of the present invention, when for example, an inner surface processing step is performed on a hollow spring member, corrosion of the inner surface of the spring member can be prevented by immediately carrying out an end sealing step. In addition, in the end sealing step, it is not necessary to use another member such as a lid member, etc., since the core material of the end of the spring member is gathered by machining. Therefore, in a coil forming step after the end sealing step, formation of clearance can be prevented at the end Wa of the spring member, and a sealing effect can be sufficiently obtained, even if the end Wa of the spring member is gripped by a chuck portion and the spring member is wound around a rod.

Additionally, a coating material can be prevented from entering into the inside of the spring member, even if the coating step is carried out after the coil forming step, since the end of the spring member is sufficiently sealed. Consequently, generation of dripping can be prevented near the end, and product appearance of the spring member can be improved. Furthermore, the end of the hollow spring member can be formed in a hemispherical shape, and therefore, there is no corner at the end, and a design advantage can be obtained. In addition, since stress-type pressure residence of the end is increased, the end can be prevented from being crushed when it is gripped by a chuck, etc.

As described above, according to the hollow coil spring of the present invention, technical problems occurring in conventional methods for manufacturing a hollow coil spring can be solved, and therefore, the hollow coil spring of the present invention can be handled in the same way as that of the solid coil spring, and a design advantage can be obtained.

The production method for a hollow coil spring of the present invention can use various structures. For example, a spinning can be carried out as a processing. In the spinning, both ends of the spring member may be heated or may be not heated.

A hollow spring of the present invention is formed by the method for manufacturing a hollow coil spring of the present invention.

Effects of the Invention

According to the hollow coil spring of the present invention or the manufacturing method therefor, corrosion at the inner surface thereof can be prevented and the product appearance thereof can be improved, and moreover, in the manufacturing, the hollow coil spring can be handled in the same manner as a solid coil spring.

EXPLANATION OF REFERENCE NUMERALS

Figure 1:
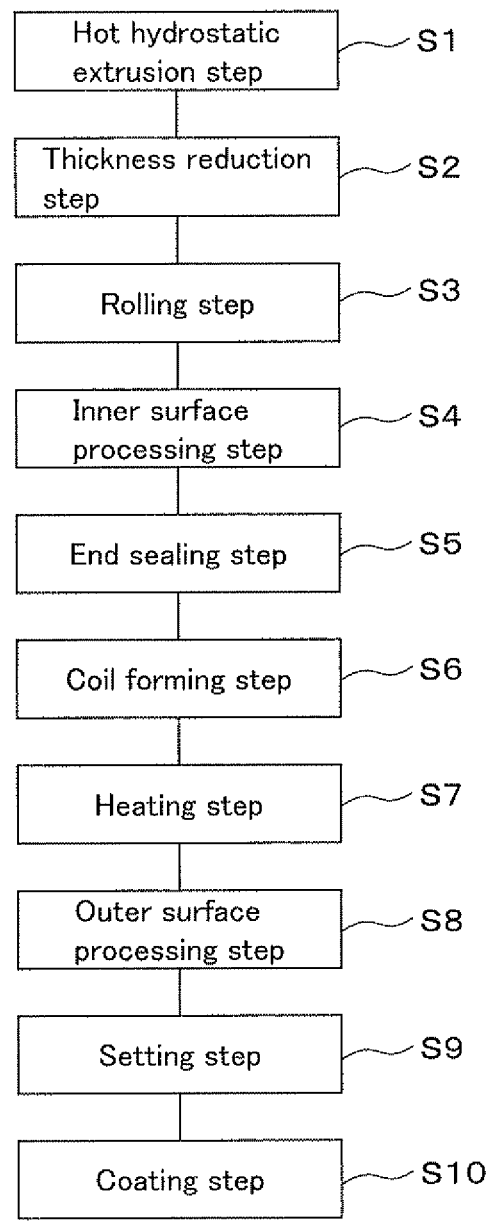
FIG. 1 is a flow chart showing each step of the method for manufacturing the hollow coil spring according to an embodiment of the present invention.

Reference character W denotes a spring member, and Wa denotes an end, and R denotes a squeezing roller.

Embodiments of the Invention (1) Method for Manufacturing Hollow Coil Spring

In the following, one embodiment of the present invention will be described with reference to the Figures. FIG. 1 is a flow chart showing each step of the method for manufacturing the hollow coil spring according to one embodiment of the present invention. For example, as described in FIG. 1, the hollow coil spring is produced by performing a hot hydrostatic extrusion step S1, a thickness reduction step S2, a rolling step S3, an inner surface processing step S4, an end sealing step S5, a coil forming step S6, a heating step S7, an outer surface processing step S8, a setting step S9, and a coating step S10 in turn. In the present embodiment, the end sealing step as a main step of the present invention will be described in detail, and description of other steps will be simplified.

For example, the hot hydrostatic extrusion step S1 is a straight pipe forming step for forming a straight and hollow spring member (a seamless spring steel pipe or the like). In the thickness reduction step S2, at least an outer surface of the spring member obtained in the hot hydrostatic extrusion step S1 is ground, so that the surface is decarburized and fine defects thereon are ground off, and therefore, the surface property is improved. In the rolling step S3, the spring member is extended by rolling. In the inner surface processing step S4, the inner surface of the spring member is polished by blasting in which abrasives are blasted toward the inner surface of the spring member and are drawn.

In the end sealing step S5, core material of the end of the spring member is gathered by machining, so as to seal the end. In the end sealing step S5, it is preferable that spinning be carried out as a processing, as described below. In the coil forming step S6, the spring member is wound around the rod, by moving a chuck portion which grips one end of the spring member in an axial direction of the rod while rotating around an outer circumference of the rod, and therefore, a hollow body in a coil shape is formed. In this case, it is not necessary to devise a shape of the end in order to grip the end by the chuck portion, since the end of the spring member is sealed in the end sealing step S5, and it can be handled in the same manner as for the solid spring member.

In the heating step S7, elasticity as a spring is imparted to the hollow body by hardening and annealing the hollow body. In the outer surface processing step S8, compressive residual stress is imparted by shot peening on the outer surface of the hollow body. In the setting step S9, settling as a spring is prevented by releasing after compressing the hollow body. In the coating step S10, powder coating is subjected to the hollow body.

The above hot hydrostatic extrusion step S1, thickness reduction step S2, rolling step S3, coil forming step S6, heating step S7, outer surface processing step S8, setting step S9, and coating step S10 can be carried out in a conventional manner. It is preferable that an inner surface polishing method in which, for example, the present applicant proposes, be used in the inner surface processing step S4.

In the inner surface processing step S4, a first blasting and a second blasting are carried out in order. It is preferable that in the first blasting, abrasives be blasted to an opening portion of one end of the spring member and be drawn from an opening portion of the other end of the spring member, and in contrast, in the second blasting, that abrasives be blasted to the opening portion of the other end of the spring member and be drawn from the opening portion of the one end of the spring member. In the inner surface processing step S4, a method which electromagnetically polishes using an electrolyte, a method which grinds by a rotary brush coated with diamond, a magnetic beam method which polishes using magnetic powder, etc., can be used instead of the above method.

(2) End Sealing Step

Figure 2:
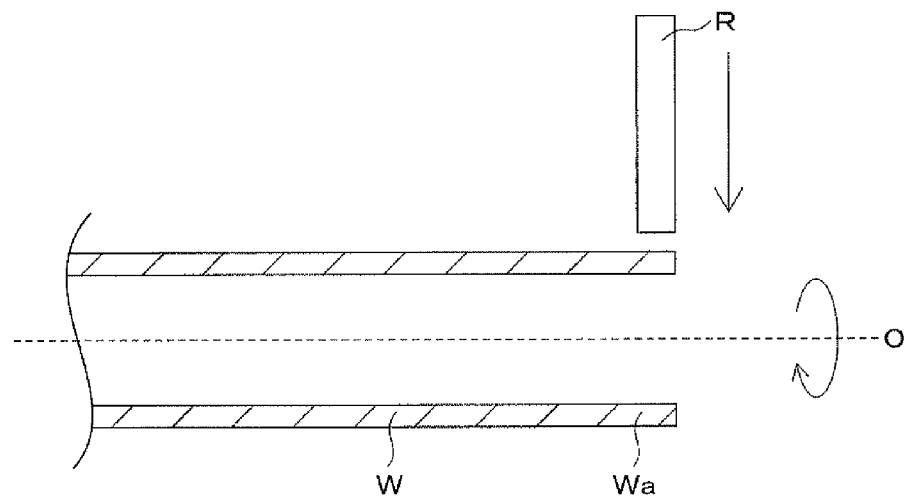
FIG. 2 is a cross-section in an axial direction to explain a spinning used for an end sealing step in the method for manufacturing the hollow coil spring according to an embodiment of the present invention.
Figure 3:
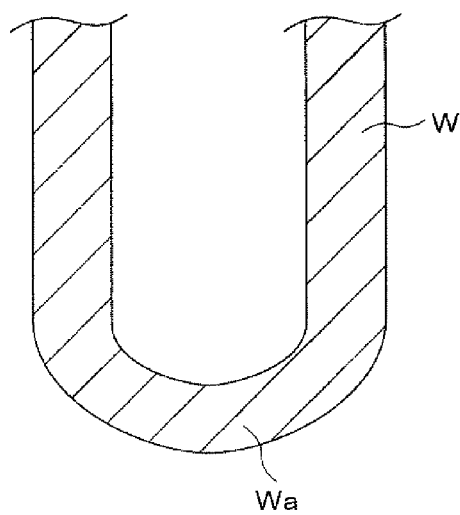
FIG. 3 is a cross-section in an axial direction showing an enlarged end of the spring member obtained in the end sealing step shown in FIG. 2.

In following, spinning in the end sealing step S5 which is a main step of the present invention will be explained with reference to FIGS. 2 and 3.

For example, the spinning of the end sealing step S5 is immediately carried out after the inner surface processing step S4. In the spinning, a spring member W is fixed on a rotating portion (not shown), for example, as shown in FIG. 2, and it is rotated around an axis O by the rotating portion. Then, a squeezing roller R is moved to the inside in a radial direction (an arrow direction in figure) of the spring member W in a rotating state, and the squeezing roller R is contacted with an outer circumference of an end Wa of the spring member W.

Next, the squeezing roller R is moved in an axial direction as necessary, while the end Wa of the spring member W is pressed to the inside in a radial direction by the squeezing roller R. As a result, the end Wa of the spring member W is reduced by plastic deformation, and it is finally sealed as shown in FIG. 3. Here, in the spinning, the end Wa of the spring member W may be heated or may not be heated. Both ends of the spring member W are sealed by carrying out the above end sealing step S5 at both ends.

As described above, according to the present embodiment, the corrosion of the inner surface of the spring member W is prevented, since for example, the end sealing step S5 can be carried out after the inner surface processing step S4. In addition, in the end sealing step S5, the end Wa is sealed by which the core material of the end Wa of the spring member W is gathered by machining, and it is not necessary to use another member such as a lid member, etc. Therefore, in the coil forming step S6 after the end sealing step S5, formation of clearance can be prevented at the end Wa of the spring member W and a sealing effect can be sufficiently obtained, even if the end Wa of the spring member W is gripped by the chuck portion and the spring member W is wound around the rod.

Additionally, a coating material can be prevented from penetrating into the inside of the spring member W, even if the coating step S10 is carried out after the coil forming step S6, since the end Wa of the spring member W is sufficiently sealed. Consequently, generation of dripping can be prevented near the end Wa, and product appearance of the spring member W can be improved. Furthermore, the end Wa of the spring member W can be formed in a hemispherical shape, and therefore, there is no corner at the end Wa and a design advantage can be obtained. In addition, since stress-type pressure residence of the end Wa is increased, the end Wa can be prevented from being crushed when it is gripped by a chuck, etc.

As described above, according to the hollow coil spring of the present invention, technical problems generated in conventional methods for manufacturing a hollow coil spring can be solved, and therefore, the hollow coil spring of the present invention can be handled in the same manner as that of the solid coil spring, and a design advantage can be obtained.

The present invention was explained using the above embodiment; however, the present invention is not limited to the above embodiment and various modifications can be made. For example, in the above embodiment, the spinning was used as an end sealing step S5; however, the end sealing step S5 is not limited to the spinning, and other machining techniques in which the end Wa can be sealed by gathering core material of the end Wa of the spring member W, may be used instead of the spinning. For example, the end Wa of the spring member W may be sealed by carrying out a step for deforming the end Wa of the spring member W in a flat shape, and subjecting welding to the deformed end Wa.

The invention claimed is:

1. A method for manufacturing a hollow coil spring, comprising:

sealing opposite ends of a hollow spring member by gathering a core material of each respective end of the hollow spring member by machining, the machining including relatively rotating the hollow spring member and a tool; and forming the hollow spring member into a coil shape after the sealing step, wherein in the sealing step, the ends of the hollow spring member are each formed in a hemispherical shape, and in the forming step, the hollow spring members is wound around a rod by moving a chuck portion, which grips one end of the hollow spring member, in an axial direction of the rod while relatively rotating around an outer circumference of the rod, thereby forming a hollow body in the coiled shape.

2. The method for manufacturing a hollow coil spring according to claim 1, wherein the machining is sealed and formed by rotation.

3. The method for manufacturing a hollow coil spring according to claim 1, wherein in the sealing step, spinning is carried out as the machining.

* * * * *